United States Patent
Agnihotri

(10) Patent No.: US 11,606,528 B2
(45) Date of Patent: Mar. 14, 2023

(54) ADVANCED TELEVISION SYSTEMS COMMITTEE (ATSC) 3.0 LATENCY-FREE DISPLAY OF CONTENT ATTRIBUTE

(71) Applicant: Saturn Licensing LLC, New York, NY (US)

(72) Inventor: Tanmay Agnihotri, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 444 days.

(21) Appl. No.: 16/710,746

(22) Filed: Dec. 11, 2019

(65) Prior Publication Data

US 2020/0186741 A1    Jun. 11, 2020

Related U.S. Application Data

(63) Continuation-in-part of application No. 15/925,190, filed on Mar. 19, 2018, now Pat. No. 11,044,294.
(Continued)

(51) Int. Cl.
*H04N 5/445*  (2011.01)
*H04N 21/2662*  (2011.01)
(Continued)

(52) U.S. Cl.
CPC ..... *H04N 5/445* (2013.01); *H04N 21/234372* (2013.01); *H04N 21/2662* (2013.01);
(Continued)

(58) Field of Classification Search
CPC .......... H04N 5/445; H04N 21/234372; H04N 21/26258; H04N 21/2662;
(Continued)

(56) References Cited

U.S. PATENT DOCUMENTS 5,144,425 A * 9/1992 Joseph ............ H04N 19/15
375/E7.091
6,005,938 A   12/1999 Banker et al.
(Continued)

FOREIGN PATENT DOCUMENTS

WO    2016140479 A1    9/2016
WO    2016178494 A1   11/2016
(Continued)

OTHER PUBLICATIONS

Agnihotri et al., "ATSC 3.0 Playback Using MPEG Media Transport Protocol (MMTP)", related U.S. Appl. No. 15/925,190, Final Office Action dated Mar. 13, 2020.
(Continued)

*Primary Examiner* — Michael B. Pierorazio
(74) *Attorney, Agent, or Firm* — Chris Kolefas

(57) ABSTRACT

Techniques are described for expanding and/or improving the Advanced Television Systems Committee (ATSC) 3.0 television protocol in robustly delivering the next generation broadcast television services. A dynamic MPD can be supplemented by offline descriptor information transmitted OTA at display time so that the descriptor information, e.g., language information, captioning information, and the like, can be immediately presented on a UI.

17 Claims, 4 Drawing Sheets

Related U.S. Application Data

(60) Provisional application No. 62/613,155, filed on Jan. 3, 2018.

(51) Int. Cl.
  *H04N 21/2343* (2011.01)
  *H04N 21/485* (2011.01)
  *H04N 21/488* (2011.01)
  *H04N 21/426* (2011.01)

(52) U.S. Cl.
  CPC ... *H04N 21/42653* (2013.01); *H04N 21/4856* (2013.01); *H04N 21/4884* (2013.01)

(58) Field of Classification Search
  CPC ......... H04N 21/42653; H04N 21/4348; H04N 21/4355; H04N 21/4622; H04N 21/4856; H04N 21/4884; H04N 21/6125; H04N 21/8456; H04N 21/8543
  See application file for complete search history.

(56) References Cited

U.S. PATENT DOCUMENTS

| | | | | |
|---|---|---|---|---|
| 6,263,022 | B1 * | 7/2001 | Chen | H04N 19/126 375/240.03 |
| 6,373,904 | B1 | 4/2002 | Sakamoto et al. | |
| 6,393,562 | B1 | 5/2002 | Maillard | |
| 6,490,705 | B1 * | 12/2002 | Boyce | H04N 19/66 714/776 |
| 6,496,217 | B1 * | 12/2002 | Piotrowski | H04N 19/89 375/E7.005 |
| 6,501,797 | B1 * | 12/2002 | van der Schaar | H04N 19/34 708/203 |
| 6,584,199 | B1 | 6/2003 | Kim et al. | |
| 6,674,477 | B1 * | 1/2004 | Yamaguchi | H04N 19/50 375/E7.113 |
| 6,920,222 | B1 | 7/2005 | Tsukahara et al. | |
| 7,095,782 | B1 * | 8/2006 | Cohen | H04N 21/2404 375/E7.02 |
| 7,958,532 | B2 * | 6/2011 | Paul | H04N 21/234327 725/135 |
| 8,064,389 | B2 * | 11/2011 | Khan | H04B 7/2123 375/240 |
| 8,072,943 | B2 * | 12/2011 | Khan | H04L 1/007 370/335 |
| 8,284,845 | B1 * | 10/2012 | Kovacevic | H04N 21/4345 375/240 |
| 8,401,191 | B2 | 3/2013 | Chen et al. | |
| 8,467,656 | B2 * | 6/2013 | Kamio | G11B 27/105 386/200 |
| 8,671,422 | B2 | 3/2014 | Foti | |
| 8,904,445 | B2 * | 12/2014 | Britt | H04N 21/4583 725/54 |
| 9,002,006 | B2 | 4/2015 | Chen et al. | |
| 9,848,217 | B2 * | 12/2017 | Choi | H04N 21/234327 |
| 9,986,302 | B2 * | 5/2018 | Takahashi | H04N 19/30 |
| 10,397,642 | B2 * | 8/2019 | Tsukagoshi | H04N 21/436 |
| 10,595,066 | B2 * | 3/2020 | Czelhan | G10L 25/57 |
| 2003/0073402 | A1 | 4/2003 | Herring et al. | |
| 2003/0172376 | A1 | 9/2003 | Coffin | |
| 2004/0208239 | A1 * | 10/2004 | Karlsson | H04K 3/82 375/219 |
| 2005/0198680 | A1 | 9/2005 | Baran et al. | |
| 2006/0004661 | A1 | 1/2006 | Bacon | |
| 2006/0053442 | A1 | 3/2006 | Ridderheim et al. | |
| 2007/0098165 | A1 | 5/2007 | Koshikawa | |
| 2007/0179948 | A1 * | 8/2007 | Jennings, III | H04L 67/1068 |
| 2008/0062168 | A1 * | 3/2008 | Poullier | H04N 1/00132 345/419 |
| 2008/0120645 | A1 * | 5/2008 | Yun | H04N 21/426 725/33 |
| 2008/0168133 | A1 | 7/2008 | Osborne | |
| 2008/0170630 | A1 * | 7/2008 | Falik | H04N 21/44004 375/E7.193 |
| 2009/0034629 | A1 * | 2/2009 | Suh | H04N 21/41407 375/240.27 |
| 2009/0136203 | A1 | 5/2009 | Stam et al. | |
| 2009/0187960 | A1 * | 7/2009 | Lee | H04N 21/234327 375/E7.078 |
| 2009/0222855 | A1 * | 9/2009 | Vare | H04L 12/189 725/39 |
| 2009/0268806 | A1 * | 10/2009 | Kim | H04N 21/84 375/316 |
| 2009/0296535 | A1 | 12/2009 | Jones et al. | |
| 2010/0254370 | A1 * | 10/2010 | Jana | H04L 65/1083 725/116 |
| 2010/0260254 | A1 * | 10/2010 | Kimmich | H04N 19/164 375/240 |
| 2010/0260268 | A1 * | 10/2010 | Cowan | H04N 13/178 348/E13.001 |
| 2011/0002397 | A1 * | 1/2011 | Wang | H04N 19/30 375/240.26 |
| 2011/0096828 | A1 * | 4/2011 | Chen | H04L 65/756 375/E7.126 |
| 2011/0142139 | A1 | 6/2011 | Cheng et al. | |
| 2011/0164683 | A1 * | 7/2011 | Takahashi | H04N 19/31 375/E7.123 |
| 2011/0187503 | A1 * | 8/2011 | Costa | H05K 7/1498 340/8.1 |
| 2011/0239078 | A1 * | 9/2011 | Luby | H04N 21/2353 714/752 |
| 2011/0289542 | A1 * | 11/2011 | Kitazato | H04N 21/2362 725/115 |
| 2012/0117592 | A1 * | 5/2012 | Strein | H04N 21/2355 725/32 |
| 2012/0167133 | A1 | 6/2012 | Carroll et al. | |
| 2012/0185907 | A1 * | 7/2012 | Park | H04N 21/242 725/110 |
| 2012/0192220 | A1 | 7/2012 | Wyatt et al. | |
| 2012/0224651 | A1 * | 9/2012 | Murakami | H04L 25/03898 375/295 |
| 2012/0250619 | A1 * | 10/2012 | Twitchell, Jr. | H04W 40/24 370/328 |
| 2012/0307654 | A1 | 12/2012 | Pantos et al. | |
| 2012/0320168 | A1 * | 12/2012 | Yun | H04N 21/4347 348/51 |
| 2013/0007799 | A1 | 1/2013 | Sandoval | |
| 2013/0136193 | A1 * | 5/2013 | Hwang | H03M 13/356 714/776 |
| 2013/0247094 | A1 * | 9/2013 | Hardin | H04N 21/2385 725/33 |
| 2013/0305304 | A1 * | 11/2013 | Hwang | H04N 21/238 725/109 |
| 2013/0326553 | A1 | 12/2013 | Nicolas | |
| 2013/0332976 | A1 | 12/2013 | Shenker et al. | |
| 2014/0050458 | A1 * | 2/2014 | Mochinaga | H04N 5/85 386/239 |
| 2014/0098289 | A1 * | 4/2014 | Jang | H04N 21/440263 348/441 |
| 2014/0115472 | A1 * | 4/2014 | Mochinaga | H04N 9/8205 715/719 |
| 2014/0119712 | A1 * | 5/2014 | Jang | G11B 20/1217 386/248 |
| 2014/0204177 | A1 * | 7/2014 | Hattori | H04N 21/235 348/43 |
| 2014/0211861 | A1 * | 7/2014 | Lee | H04N 19/89 375/240.27 |
| 2014/0325572 | A1 | 10/2014 | Yie et al. | |
| 2015/0020131 | A1 * | 1/2015 | Choi | H04N 21/234327 725/116 |
| 2015/0100996 | A1 | 4/2015 | Freeman et al. | |
| 2015/0195327 | A1 | 7/2015 | Bouazizi et al. | |
| 2015/0281799 | A1 | 10/2015 | Lim | |
| 2015/0371604 | A1 * | 12/2015 | Park | H04N 21/42224 345/173 |
| 2016/0234348 | A1 | 8/2016 | Mao et al. | |
| 2016/0234355 | A1 | 8/2016 | Lee et al. | |
| 2016/0234682 | A1 | 8/2016 | Mandyam | |

(56) References Cited

U.S. PATENT DOCUMENTS

| | | | |
|---|---|---|---|
| 2016/0277778 A1* | 9/2016 | Kwon | H04N 21/615 |
| 2016/0360288 A1 | 12/2016 | Mandyam et al. | |
| 2016/0366479 A1 | 12/2016 | Crowe et al. | |
| 2016/0373489 A1 | 12/2016 | Lee et al. | |
| 2016/0373821 A1* | 12/2016 | Nair | H04N 21/2662 |
| 2017/0054520 A1 | 2/2017 | Kwak et al. | |
| 2017/0070789 A1 | 3/2017 | Liassides et al. | |
| 2017/0111692 A1* | 4/2017 | An | H04N 21/4622 |
| 2017/0134763 A1 | 5/2017 | Hwang et al. | |
| 2017/0164033 A1* | 6/2017 | Tsukagoshi | H04N 19/102 |
| 2017/0188112 A1* | 6/2017 | Takahashi | H04L 65/611 |
| 2017/0238061 A1* | 8/2017 | Deshpande | H04N 21/4382 725/139 |
| 2017/0302982 A1 | 10/2017 | Simpson et al. | |
| 2017/0366830 A1* | 12/2017 | Czelhan | H04N 21/8456 |
| 2017/0374421 A1* | 12/2017 | Yim | H04N 21/4622 |
| 2017/0374429 A1 | 12/2017 | Yang | |
| 2018/0146022 A1* | 5/2018 | Kwon | H04N 21/2362 |
| 2018/0184136 A1 | 6/2018 | Oh et al. | |
| 2018/0205975 A1 | 7/2018 | Oh et al. | |
| 2018/0270539 A1* | 9/2018 | Kim | H04N 21/47202 |
| 2018/0288468 A1 | 10/2018 | Yamagishi et al. | |
| 2018/0373847 A1 | 12/2018 | Lo et al. | |
| 2019/0058909 A1 | 2/2019 | Eyer et al. | |
| 2019/0058929 A1 | 2/2019 | Young et al. | |
| 2019/0174156 A1 | 6/2019 | Crawford et al. | |
| 2019/0215575 A1 | 7/2019 | Yang et al. | |
| 2019/0246148 A1 | 8/2019 | Oh et al. | |
| 2019/0356944 A1 | 11/2019 | Patel et al. | |
| 2020/0007922 A1 | 1/2020 | Yun | |

FOREIGN PATENT DOCUMENTS

| | | | |
|---|---|---|---|
| WO | 2016190720 A1 | 12/2016 | |
| WO | 2017184648 A1 | 10/2017 | |
| WO | 2018202768 A1 | 11/2018 | |

OTHER PUBLICATIONS

Agnihotri et al., "ATSC 3.0 Playback Using MPEG Media Transport Protocol (MMTP)", related U.S. Appl. No. 15/925,190, Applicant's response to Final Office Action filed Mar. 19, 2020.

Aguilar Santos et al., "ATSC 3.0 Advertising Notification Using Event Streams", related U.S. Appl. No. 16/275,078, Non-Final Office Action dated Oct. 26, 2021.

Aguilar Santos et al., "ATSC 3.0 Advertising Notification Using Event Streams", related U.S. Appl. No. 16/275,078, Applicant's response to Non-Final Office Action filed Dec. 6, 2021.

Agnihotri et al., "ATSC 3.0 Playback Using MPEG Media Transport Protocol (MMTP)", related U.S. Appl. No. 15/925,190, Final Office Action dated Mar. 26, 2021.

Agnihotri et al., "ATSC 3.0 Playback Using MPEG Media Transport Protocol (MMTP)", related U.S. Appl. No. 15/925,190, Applicant's response to Final Office Action filed Apr. 9, 2021.

Aguilar Santos et al., "ATSC 3.0 Advertising Notification Using Event Streams", related U.S. Appl. No. 16/275,078, Non-Final Office Action dated Feb. 16, 2021.

Aguilar Santos et al., "ATSC 3.0 Advertising Notification Using Event Streams", related U.S. Appl. No. 16/275,078, Applicant's response to Non-Final Office Action filed Apr. 8, 2021.

Agnihotri et al., "ATSC 3.0 Playback Using MPEG Media Transport Protocol (MMTP)", related U.S. Appl. No. 15/925,190, Non-Final Office Action dated Oct. 7, 2020.

Agnihotri et al., "ATSC 3.0 Playback Using MPEG Media Transport Protocol (MMTP)", related U.S. Appl. No. 15/925,190, Applicant's response to Non-Final Office Action filed Jan. 5, 2021.

"ATSC 3.0 Standards", retrieved on Feb. 16, 2018 from https://www.atsc.org/standards/atsc-3-0-standards/.

"ATSC Standard: ATSC 3.0 Interactive Content", Advanced Television Systems Committee, Dec. 18, 2017.

"ATSCaster—ROUTE and MMTP server for ATSC 3.0", ENENSYS, Jul. 2018.

"ISO/IEC 23009-5:2017—Information technology—Dynamic adaptive streaming over HTTP (DASH)—Part 5: Server and network assisted DASH (SAND)", May 2017.

Agnihotri et al., "ATSC 3.0 Playback Using MPEG Media Transport Protocol (MMTP)", file history of related U.S. Appl. No. 15/925,190, filed Mar. 19, 2018.

I. Bouazizi, "MPEG Media Transport Protocol (MMTP)", Samsung Research America, Mar. 4, 2014.

Xu et al., "DASH and MMT and their Applications", (2016).

Kim et al., "Method of DASH segments into a MMTP stream for switching contents under a hybrid broadcasting environment" (2017).

Paul Joseph Hearty, Mark Eyer, "Delivery of Information Related to Digital Rights Management (DRM) in a Terrestrial Broadcast System", file history of related U.S. Appl. No. 16/214,933, Non-Final Office Action dated Dec. 20, 2019.

Charlemagne Aguilar Santos, Tanmay Agnihotri, "ATSC 3.0 Advertising Notification Using Event Streams", file history of related U.S. Appl. No. 16/275,078, filed Feb. 13, 2019.

Aguilar Santos et al., "ATSC 3.0 Advertising Notification Using Event Streams", related U.S. Appl. No. 16/275,078, Final Office Action dated Jul. 20, 2021.

Aguilar Santos et al., "ATSC 3.0 Advertising Notification Using Event Streams", related U.S. Appl. No. 16/275,078, Applicant's response to Final Office Action filed Sep. 5, 2021.

Agnihotri et al., "ATSC 3.0 Playback Using MPEG Media Transport Protocol (MMTP)", related U.S. Appl. No. 15/925,190, Non-Final Office Action dated Jun. 17, 2020.

Agnihotri et al., "ATSC 3.0 Playback Using MPEG Media Transport Protocol (MMTP)", related U.S. Appl. No. 15/925,190, Applicant's response to Non-Final Office Action filed Jun. 20, 2020.

"ATSC Candidate Standard Revision: Signaling, Delivery, Synchronization, and Error Protection", Doc. S33-1-893r4, Apr. 30, 2018.

"RFC 4033, DNS Security Introduction and Requirements," Arends, R., Austein, R., Larson, M., Massey, D., and S. Rose, Internet Engineering Task Force, Fremont, CA, Mar. 2005.

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.

"ATSC Standard: ATSC 3.0 Interactive Content (A/344)", May 2, 2019.

"ATSC Standard: ATSC 3.0 Security and Service Protection", Aug. 20, 2019.

"ATSC Standard: ATSC 3.0 System", Sep. 17, 2019.

"ATSC Standard: Signaling, Delivery, Synchronization, and Error Protection (A/331)", Jun. 19, 2019.

"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.

"RFC 5289, TLS Elliptic Curve Cipher Suites with SHA-256/384 and AES Galois Counter Mode (GCM)," E. Rescorla, Internet Engineering Task Force, Fremont, CA, Aug. 2008.

"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.

"RFC 5652, Cryptographic Message Syntax (CMS)," R. Housley, Internet Engineering Task Force, Fremont, CA, Sep. 2009.

"RFC 5751, Secure/Multipurpose Internet Mail Extensions (S/MIME) Version 3.Message Specification," B. Ramsdell, S. Turner, Internet Engineering Task Force, Fremont, CA, Jan. 2010.

"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.

"RFC 5758, Internet X.509 Public Key Infrastructure: Additional Algorithms and Identifiers for DSA and ECDSA," Q. Dang, S.

(56) References Cited

OTHER PUBLICATIONS

Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Ceilificate Status Protocol (OCSP) Profile for High-Volume Environments," A. Deacon, R. Hurst, Internet Engineering Task Force, Fremont, CA, Sep. 2007.
U.S. Appl. No. 16/214,933, filed Dec. 10, 2018, Paul Joseph Hearty.
U.S. Appl. No. 16/275,078, filed Feb. 13, 2019, Charlemagne Aguilar Santos.
Paul Joseph Hearty, Mark Eyer, "Delivery of Information Related to Digital Rights Management (DRM) in a Terrestrial Broadcast System", related U.S. Appl. No. 16/214,933, Final Office Action dated Mar. 27, 2020.
Paul Joseph Hearty, Mark Eyer, "Delivery of Information Related to Digital Rights Management (DRM) in a Terrestrial Broadcast System", related U.S. Appl. No. 16/214,933, Applicant's response to Final Office Action dated Apr. 3, 2020.

\* cited by examiner

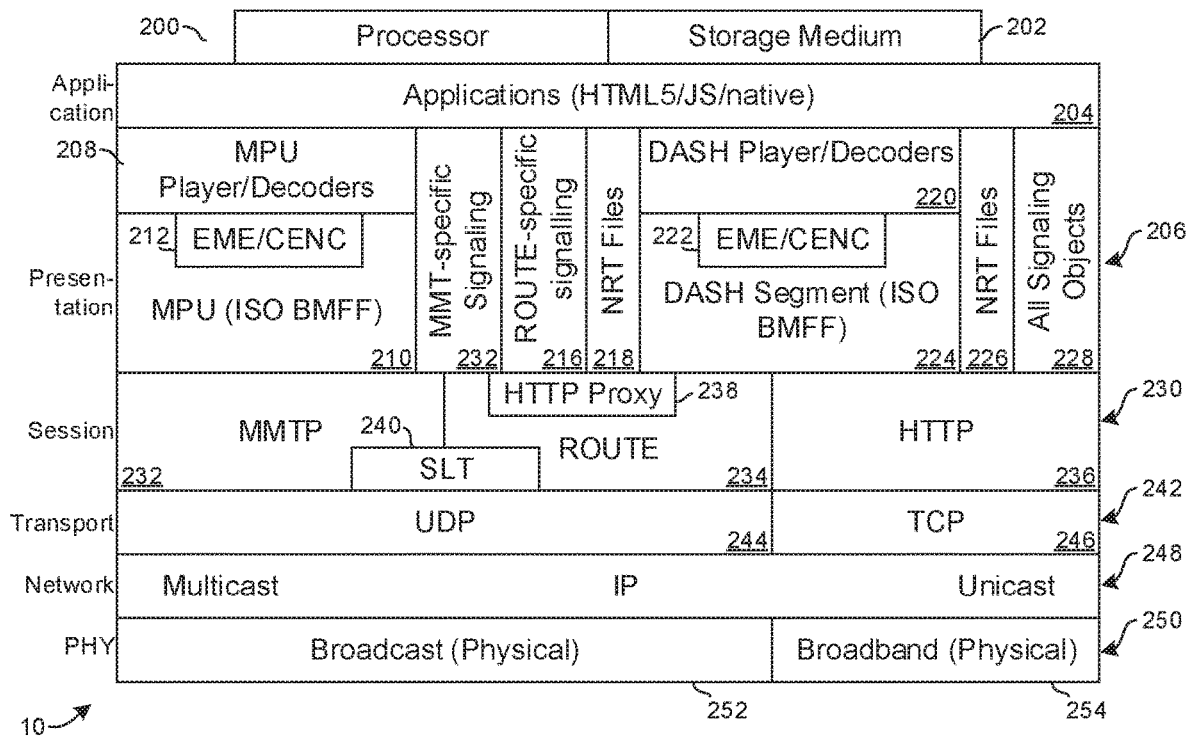
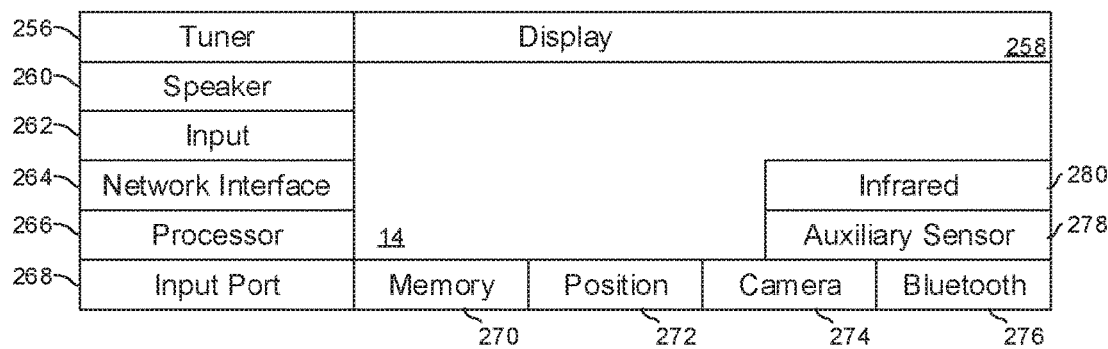
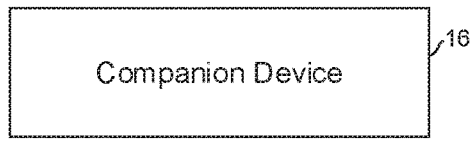
FIG. 2

302

300

```
<MPD xmlns:xsi="http://www.w3.org/2001/XMLSschema-instance'
xmlns='urn:mpeg:dash:schema:mpd:2011'
xsi:schemalocation:'urn:mpeg:dash:schema:mpd:2011 DASH-MPD.xsd'
type='dynamic'profiles='urn:mpeg:dash:profile:isoff-live:2011'
mediaPresentationDuration='PT0H0M30S'minBufferTime='PT0H0M0S'>
```

304  306

```
<AdaptationSet contentType="text"
                mimeType="application/mp4"
                segmentAlignment="true"
                lang="en">
    <SupplementalProperty schemeIdUri="http://dashif.org/guidelines/dash-atsc-closedcaption"
                          value="ar:16-9;er=0:0;profile:0;3d:0"/>
    <Representation id="c0"
                    codecs="stpp.ttml.im1t"
                    bandwidth="2896"/>

</AdaptationSet>
```

ADVANCED TELEVISION SYSTEMS COMMITTEE (ATSC) 3.0 LATENCY-FREE DISPLAY OF CONTENT ATTRIBUTE

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, signaling and other ATSC 3.0 content typically is conveyed in media presentation description (MPD) files. An MPD is formatted in accordance with the dynamic adaptive streaming over hypertext transfer protocol (HTTP) (DASH) protocol. When a player starts playback of ATSC 3.0 content the MPD is parsed by the player and playback starts as per DASH protocol.

On the player (TV), when the display button is pressed, ATSC 3.0 content attribute information such as language, aspect ratio, and bitrate may be sought to be displayed. However, this information heretofore has not been part of the MPD. Instead, this attribute information is received in Motion Picture Experts Group (MPEG) media transport protocol (MMTP) packets that arrive asynchronously to creating the MPD to which the packets relate, meaning that a short pause may be required to wait for the MMTP packets to create (and transmit) the MPD, delaying play back, which is undesirable.

Accordingly, a digital television system such as an Advanced Television Systems Committee (ATSC) 3.0 system includes at least one processor configured to execute instructions which when executed by the processor configure the processor to identify at least one Advanced Television systems Committee (ATSC) 3.0 content. The instructions are executable to, asynchronously from a broadcast of the ATSC 3.0 content, identify a least one Motion Picture Experts Group (MPEG) media transport protocol (MMTP) packet containing information pertaining to at least a first display descriptor related to at least a first attribute of the ATSC 3.0 content. The instructions are executable to, responsive to a display command to present the ATSC 3.0 content, generate at least one media presentation description (MPD) file including a dynamic type indicator and at least the first display descriptor, and use the MPD by at least one player in response to the display command.

In examples, the first attribute may include a language attribute such as a captioning language or audio language related to the ATDC 3.0 content. The first attribute may include, in addition or in combination, any of a video bitrate attribute and an aspect ratio attribute.

In example implementations, the dynamic type indicator is in an MPD set of the MPD. In some embodiments, the first display descriptor is in an adaptation set of the MPD.

The system also may include the player configured with executable instructions to parse the MPD and responsive to the dynamic type indicator, parse the first display descriptor from the MPD to present on at least one user interface (UI) the first attribute.

In a digital television delivery system, a method includes receiving at least a first media presentation description (MPD) file for presenting digital television content and identifying a dynamic type indicator in the MPD. The method includes, responsive to identifying the dynamic type indicator, parsing at least a first adaption set of the MPD to identify at least a first display descriptor indicating at least a first attribute of the digital television content. Responsive to identifying the first display descriptor, the method includes presenting on at least one display at least the first attribute of the digital television content.

In another aspect, a system of digital television includes at least one player comprising at least one processor configured with instructions executable to parse at least a first media presentation description (MPD) file containing information for presenting digital television content. The instructions can be executed to, responsive to identifying that the first MPD contains a dynamic type indicator, parse at least one adaptation set in the first MPD to extract information pertaining to at least a first attribute of the digital television content. The first attribute includes at least one of: bitrate, language, aspect ratio. The instructions are executable to present on at least one display the first attribute.

The details of the present application, both as to its structure and operation, can best be understood in reference to the accompanying drawings, in which like reference numerals refer to like parts, and in which:

BRIEF DESCRIPTION OF THE DRAWINGS

FIG. 2 is a block diagram showing components of the devices shown in FIG. 1;

FIG. 3 illustrates a portion of a dynamic media presentation description (MPD) file according to present principles;

DETAILED DESCRIPTION

Figure 1:
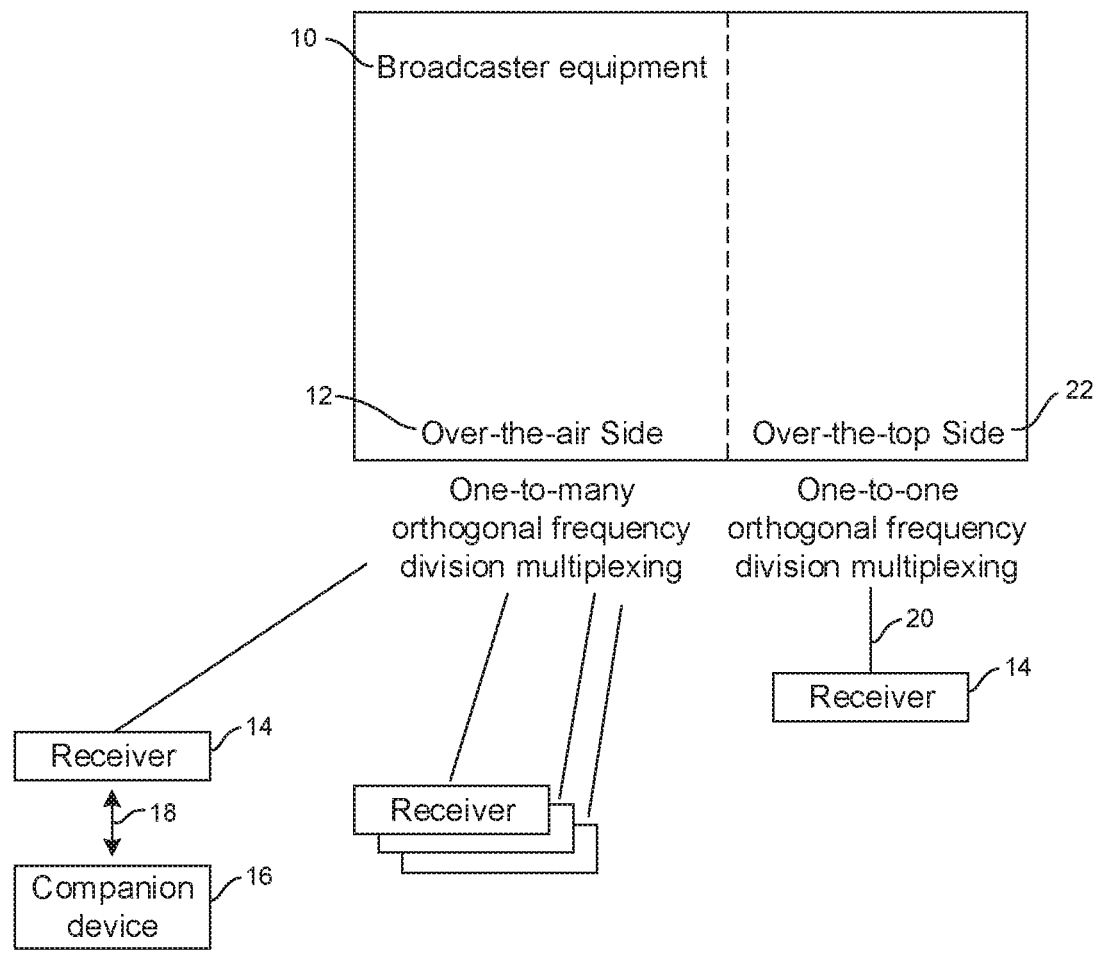
FIG. 1 is a block diagram of an Advanced Television Systems Committee (ATSC) 3.0 system.

This disclosure relates to technical advances in Advanced Television Systems Committee (ATSC) 3.0 television. A system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access web sites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Referring now to FIG. 2, details of the components shown in FIG. 1 may be seen. FIG. 2 illustrates the broadcaster equipment 10 in terms of a protocol stack that may be implemented by a combination of hardware and software. As discussed below, using the ATSC 3.0 protocol stack, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)).

The broadcaster equipment 10 can include one or more processors 200 accessing one or more computer storage media 202 such as any memories or storages described herein to execute one or more software applications in a top level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as "media playback units" (MPU) 208 that decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extensions (EME)/common encryption (CENC) module 212.

FIG. 2 further illustrates that on the broadcast side the presentation layer 206 may include signaling modules, including a Motion Picture Experts Group (MPEG) media transport protocol (MMTP) signaling module 214 and a real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226, and may also include signaling objects 228 for providing play back signaling.

Below the presentation layer 206 in the protocol stack is a session layer 230. The session layer 230 includes, on the broadcast side, MMTP protocol 232 and ROUTE protocol 234. MMTP wraps the ISO BMFF files with metadata for broadcast delivery. Essentially, MMTP contains pointers to signaling components that identify physical layer pipes (PL), each of which may be thought of as a separate video stream configured for a particular receiver type with source and destination identification information. Other signaling components typically are provided to aid in the playback of the audio video content.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The protocol stack also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts machine access code (MAC) format to be suitable to be transported over the relevant medium, and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH-industry forum (IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with a an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Now referring to FIG. 3, a dynamic MPD 300 is shown that can be supplemented by otherwise offline descriptor information at display time so that the descriptor information, e.g., language information, captioning information, and the like, can be immediately presented on a UI without delaying creation and transmission of the requisite MPD. It is to be understood that FIG. 3 shows only the relevant portions of a dynamic MPD consistent with present principles, with portions shown in bold italics representing present techniques.

In the example shown, the MPD 300 includes an MPD set 302 that includes a type field 304 indicating at 306 that the MPD is dynamic, i.e., that it may be created on the transmission end prior to fully completing it with attribute information. In the example shown, the MPD 300 has been completed upon receipt of the MMTP packets containing the attribute information, so in one or more adaptation sets 308 one or more content attribute indicators 310 may appear. In the example shown, the content attribute indicators include an indication that the language of the captioning of the related ATC 3.0 content is in English and that the aspect ratio of the video of the related ATSC 3.0 content is 16:9. Further attributes may include language of the ATSC 3.0 content audio and video bitrate.

Also, further attributes may include an easy reader attribute for captioning (for example, er:0) and an image or text profile for captions (for example, profile:0;3d.0). If desired, a representation set 312 nested within the adaptation set 308 may include a codec indicator 314 indicating that a codec for captions (e.g., stpp.ttml.imlt).

Figure 4:
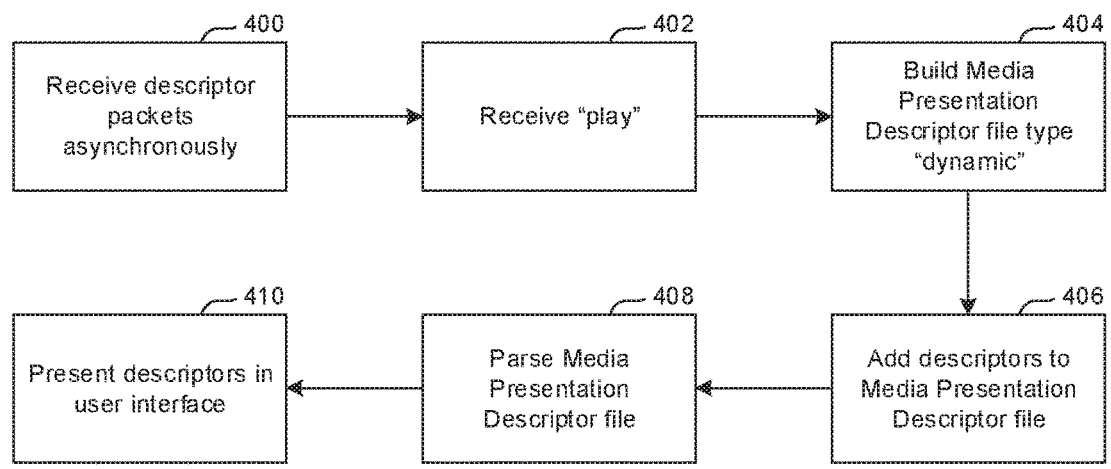
FIG. 4 is a flow chart of example logic consistent with present principles.

Refer now to FIG. 4. Commencing at block 400, MMTP descriptor packets are received asynchronously before or after generating the MPD. These packets contain information including language type, aspect ratio, and bitrate from MPU descriptors in the OTA signal. These descriptors are part of the OTA signal. A "play" or similar command such as "display" is received from a player at block 402 to play the ATSC 3.0 content related to the descriptor packets at block 400. Moving to block 404 the dynamic MPD is constructed. At block 406 the attribute descriptors from the MMTP packets received at block 400 are added to the MPD, which is sent to the requesting player. The player parses the MPD at block 408 to recover the attribute descriptors and present descriptions of the attributes at block 401 on a display in a user interface (UI).

Figure 5:
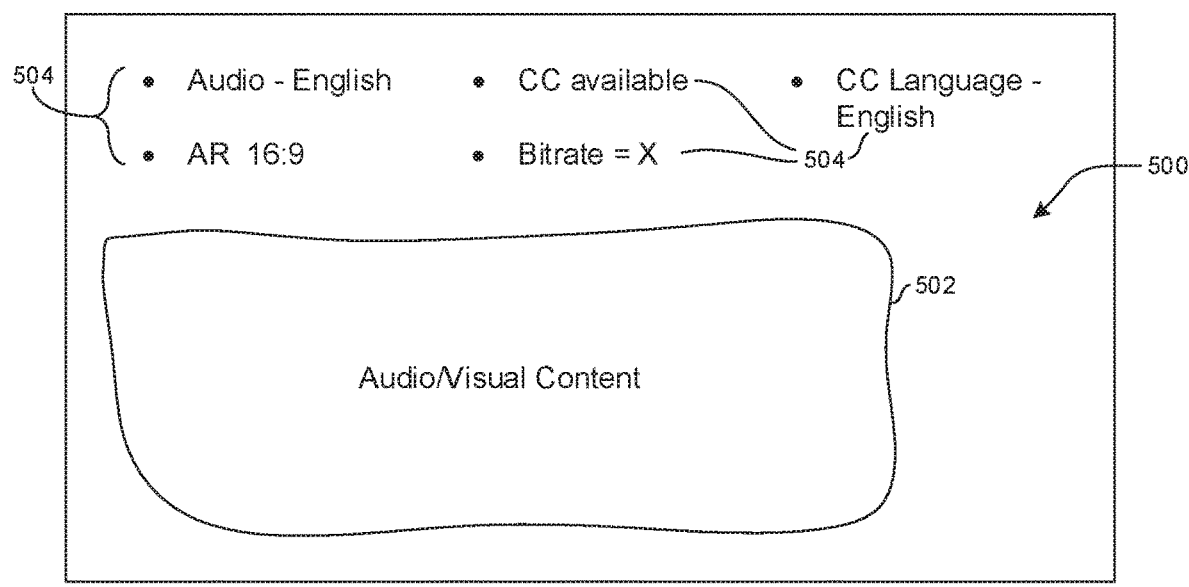
FIG. 5 is a screen shot of a user interface (UI) consistent with present principles.

FIG. 5 illustrates such a UI 500 in which the ATSC 3.0 audio video content 502 is presented along with various attributes 504 consistent with disclosure above. Below is an example version in extensible markup language (XML) of an MPD. Note that the example contains information only for captions. When the MPU descriptors for the audio video arrive the MPD is updated with information such as audio language, etc.

```
<?xml version='1.0' encoding='UTF-8'?>
<MPD xmlns:xsi="http://www.w3.org/2001/XMLSchema-instance"
xmlns="urn:mpeg:dash:schema:mpd:2011"
```

-continued

```
xsi:schemalocation="urn:mpeg:dash:schema:mpd:2011 DASH-MPD.xsd" type="dynamic"
profiles="urn:mpeg:dash:profile:isoff-live:2011" mediaPresentationDuration="PT0H0M30S"
minBufferTime="PT0H0M0S">
    <Period start="PT0S">
        <AdaptationSet contentType="video" codecs="hev1" mimeType="video/mp4">
            <BaseURL>mmtp://VIDEO</BaseURL>
            <Representation id="Video1.1.1.1" />
        </AdaptationSet>
        <AdaptationSet mimeType="audio/mp4" contentType="audio" codecs="mp4a">
            <BaseURL>mmtp://AUDIO</BaseURL>
            <Representation id="Audio1.1.1" />
        </AdaptationSet>
        <AdaptationSet contentType="text" mimeType="application/mp4"
segmentAlignment="true" lang="en">
            <BaseURL>mmtp://CAPTION</BaseURL>
            <SupplementalProperty
schemeIdUri="http://dashif.org/guidelines/dash-atsc-closedcaption"
value="ar:16-9;er:0;profile:0;3d:0" />
            <Representation id="c0" codecs="stpp.ttml.im1t" bandwidth="2896" />
        </AdaptationSet>
    </Period>
</MPD>
```

Note that period indicated in the XML above may be encrypted for digital rights management (DRM) purposes.

It will be appreciated that whilst present principals have been described with reference to some example embodiments, these are not intended to be limiting, and that various alternative arrangements may be used to implement the subject matter claimed herein.

What is claimed is:

1. A digital television system comprising:
at least one processor configured to execute instructions which when executed by the processor configure the processor to:
identify at least one digital television content;
asynchronously from a broadcast of the digital television content, identify at least one Motion Picture Experts Group (MPEG) media transport protocol (MMTP) packet comprising information pertaining to at least a display descriptor related to at least an attribute of the digital television content;
responsive to a display command to present the digital television content:
generate at least one media presentation description (MPD) comprising a dynamic type indicator and at least the display descriptor; and
use the MPD by at least one player configured to:
parse the MPD, and
responsive to the dynamic type indicator, parse the display descriptor in the MPD to present the attribute on at least one display.

2. The digital television system of claim 1, wherein the attribute comprises a language attribute.

3. The digital television system of claim 2, wherein the language attribute comprises a captioning language attribute.

4. The digital television system of claim 2, wherein the language attribute comprises an audio language attribute.

5. The digital television system of claim 1, wherein the attribute comprises a video bitrate attribute.

6. The digital television system of claim 1, wherein the attribute comprises an aspect ratio attribute.

7. The digital television system of claim 1, wherein the dynamic type indicator is in an MPD set of the MPD.

8. The digital television system of claim 1, wherein the display descriptor is in an adaptation set of the MPD.

9. The digital television system of claim 1, wherein the digital television content comprises Advanced Television Systems Committee (ATSC) 3.0 content.

10. In a digital television system, a method comprising:
identifying at least one digital television content;
asynchronously from a broadcast of the digital television content, identifying at least one Motion Picture Experts Group (MPEG) media transport protocol (MMTP) packet comprising information pertaining to at least a display descriptor related to at least an attribute of the digital television content;
responsive to a display command to present the digital television content:
generating at least one media presentation description (MPD) comprising a dynamic type indicator and at least the display descriptor; and
using the MPD by at least one player, including:
parsing the MPD, and
responsive to the dynamic type indicator, parsing the display descriptor in the MPD to present the attribute on at least one display.

11. The method of claim 10, wherein the attribute comprises a language attribute.

12. The method of claim 11, wherein the language attribute comprises a captioning language attribute.

13. The method of claim 11, wherein the language attribute comprises an audio language attribute.

14. The method of claim 10, wherein the attribute comprises a video bitrate attribute.

15. The method of claim 10, wherein the attribute comprises an aspect ratio attribute.

16. The method of claim 10, wherein the dynamic type indicator is in an MPD set of the MPD.

17. The method of claim 10, wherein the digital television content comprises Advanced Television Systems Committee (ATSC) 3.0 content.

* * * * *